June 27, 1944.  J. R. ORELIND  2,352,491

AGRICULTURAL IMPLEMENT

Filed Aug. 1, 1942  2 Sheets-Sheet 1

Inventor:
John R. Orelind.
By Paul O. Pippel
Atty.

Patented June 27, 1944

2,352,491

UNITED STATES PATENT OFFICE 2,352,491

AGRICULTURAL IMPLEMENT

John R. Orelind, Wilmette, Ill., assignor to International Harvester Company, a corporation of New Jersey Application August 1, 1942, Serial No. 453,179

3 Claims. (Cl. 97—47)

This invention relates to agricultural implements and more particularly to agricultural implements of a type which are closely coupled to a tractor.

It is an object of the present invention to provide a means for hitching the implement to the tractor which will require less physical exertion on the part of the operator at the time of making the connection of the implement with the tractor and one where the hitching parts will be automatically seated in place upon movement of the tractor.

It is another object of the invention to provide a means for hitching implements to tractors, wherein the necessity of alining a hitch pin through two or more parts located respectively on the implement and the tractor, which must be brought into proper registry for alinement of the pin, is eliminated.

According to the present invention, there is provided as a means for hitching a closely coupled implement to the body of the tractor, forwardly of its rear axle structure, a pair of hitch straps pivoted with respect to each other and pivotally carried on the forward end of the implement. At least one of the straps has an open-ended slot in its lower edge, and this strap is the last to be finally located in place on the tractor at the time the connection of the implement is made to the same. Stud or fastening bolts are threaded into the tractor and at first a connection of the other strap is readily made secure with the tractor by one of these bolts, the tractor having been generally arranged in a position to have the implement coupled therewith. The one strap is then laid across the other fastening bolt so that its lower edge rides on the same. Then as the tractor is moved slightly forwardly or back, depending upon the location of the slot with respect to the fastening bolt, the strap will finally be drawn to a location wherein its slot will slide over the fastening bolt and move down into its proper location, whereupon the fastening bolt is tightened and the hitch device is thus finally made secure to the tractor.

Figure 1:
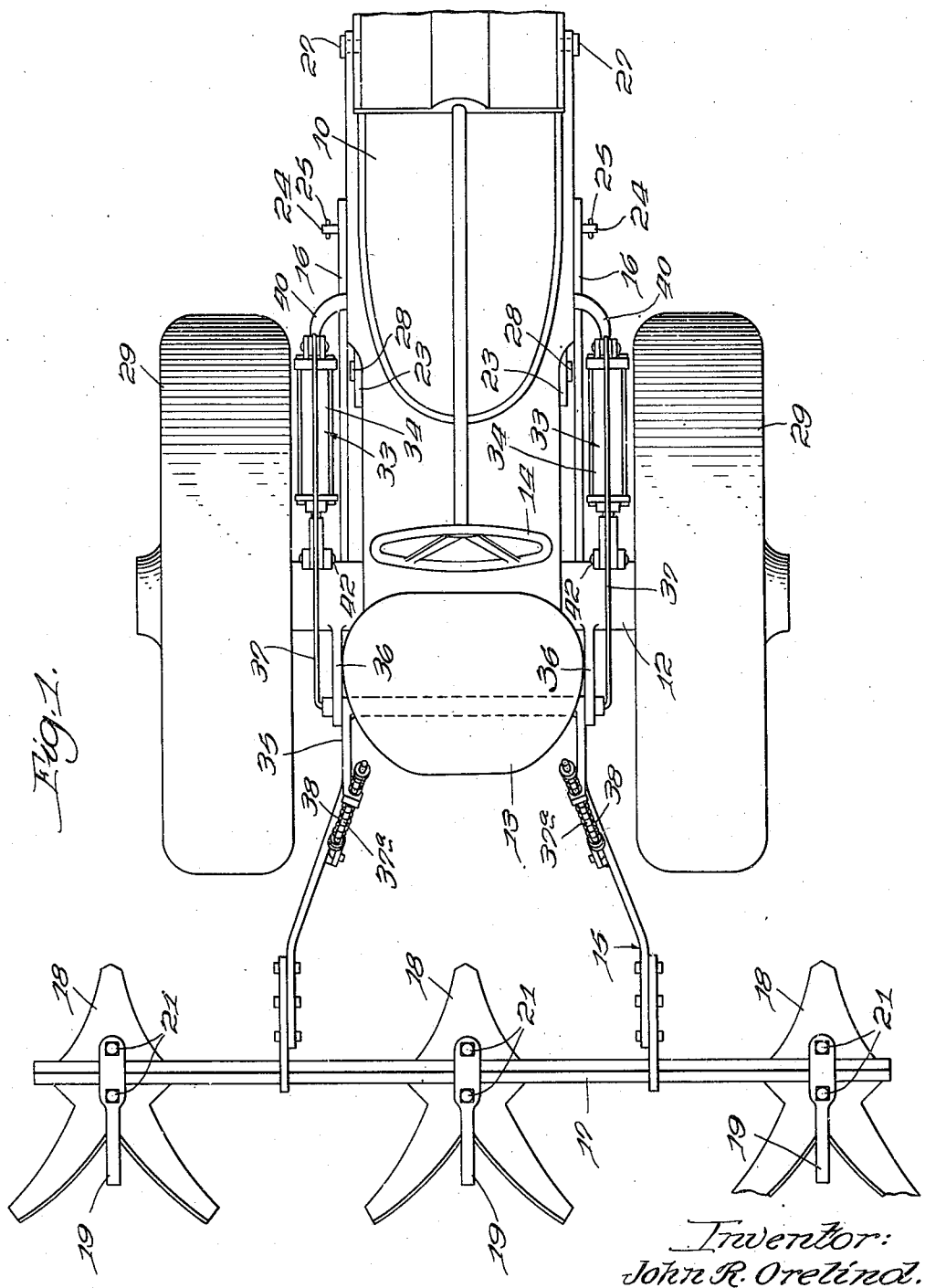
Figure 2:
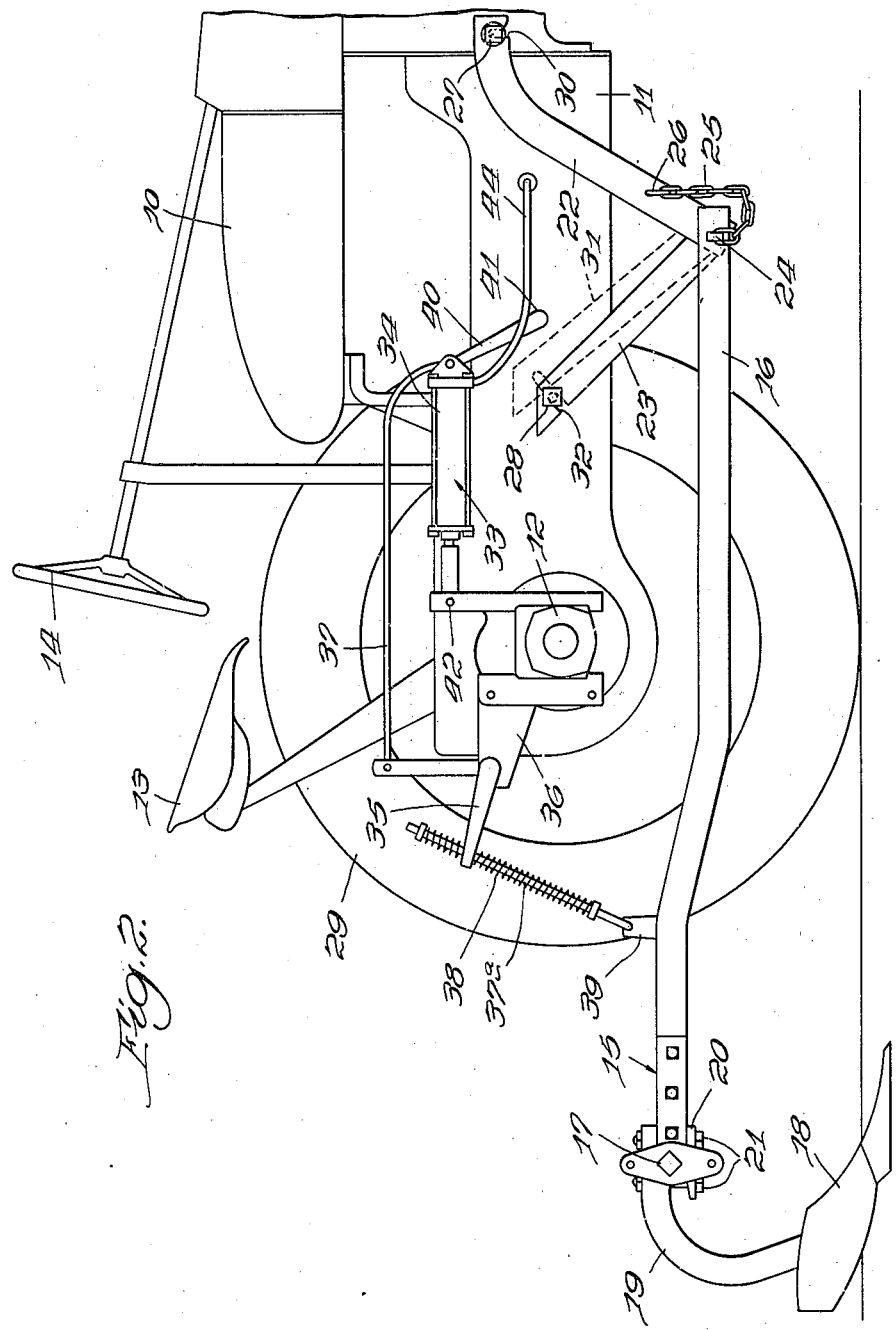

For other objects and for a better understanding of the invention reference may be had to the following detailed description taken in connection with the accompanying sheets of drawings, in which:

Figure 1 is a plan view of a portion of a tractor and of an implement closely coupled therewith by means of the hitching means of the present invention; and Figure 2 is a view in elevation of the tractor and implement shown in Figure 1, and of the hitching means with one of its straps shown in the dotted position to illustrate the manner in which connection is made with the tractor.

Referring now to the figures, there is shown a tractor 10 having a longitudinally extending body portion 11 and a rear axle structure 12 on which is mounted an operator's station 13 accessible to an operator's steering wheel 14. Adapted for connection to the longitudinally extending body portion 11 is a ground-working implement 15 including longitudinally extending side frame bars 16 adapted to extend forwardly underneath the rear axle structure to a location in advance thereof. When the connection is to be made of the implement with the tractor, the tractor is backed into its proper location and straddles the side frame bars 16.

The side frame bars 16 are connected together at their rearward ends by a transversely extending tool bar 17 of square cross-section. This tool bar is adapted to have the plow bottoms 18 clamped thereto in transversely spaced relationship thereon. Each of the plow bottoms has a standard 19, the upper end of which is formed to fit over the top of the transverse bar 17 and to be secured thereto by a clamping plate 20 and clamping bolts 21.

On the forward ends of the side frame bars 16 are respectively pivoted pairs of hitch straps 22 and 23. These hitch straps, in addition to being pivotable with respect to the forward ends of the side frame members, are also pivotable with respect to each other. The pivot connection of the hitch straps with the forward ends of the side frame bars 16 is made by means of a removable hitch pin 24 carried on a chain 25 connected to the hitch straps 22 and 23 as indicated at 26. These straps 22 and 23 are connected respectively at their upper ends to the longitudinally extending body portion 11 of the tractor by stud fastening bolts 27 and 28 permanently retained on the tractor.

Assuming that the implement is free of the tractor and that the hitch straps 22 and 23 are pinned to the forward ends of the side frame bars 16 by the hitch pin 24 and are rotated downwardly to lie on the ground, the connection of the implement to the tractor is made in the following manner: The tractor is backed into the implement so that its traction wheels 29 straddle the side frame pieces 16. The forward ends of the side frame members and either the straps 22 or 23 are lifted vertically, and connection is made of the one strap with the tractor by means of its stud fastening bolt. Assuming, as illustrated in Figure 2, the strap which is first connected to the tractor is the strap 22, it is rotated until its slot 30 will seat over the stud bolt 27. The stud bolt 27 may then be tightened a substantial amount so as to somewhat retain the strap 22 thereon, but at the same time allows for slight pivotal movement of the same strap about the bolt.

The second strap 23 is then rested on the stud bolt 28 in the manner illustrated by the dotted lines 31. This strap 23 has a slot 32 in its lower edge and when the strap is in the position illustrated by the dotted lines 31, this slot will normally be out of registry with the stud bolt 28. Instead of attempting to pull upon the implement or to release any of the parts, the strap 23 is allowed to remain in its unseated position and the tractor is then moved slightly in either forward or rearward direction sufficiently to register the slot 32 with the bolt 28. As this is done, the strap 23 will move down into its final position and all that is necessary will be to permanently secure this in its tightened position. The final tightening of the bolts 27 and 28 is now done.

It should now be apparent that a means for hitching implements to the tractor has been provided wherein only minimum effort is required for the proper registering of the parts with one another and that by the method thus provided, the time required to make the connection of the implement to the tractor has been clearly reduced.

This implement is of the close-coupled type and when it is desired to move the same to a transport position, this is effected by a power lift arrangement 33 provided on the tractor. The implement will then be pivoted about the hitch pin 24 and carried to a transport position with the plow bottoms 18 raised to a location free of the ground. This power arrangement 33 includes a fluid-actuated cylinder device 34 preferably of the double-acting type and a rockable structure 35 pivoted for clockwise rotation on a bracket structure 36 rigidly connected to the transverse axle structure 12. The connection between the fluid cylinder device 34 and the rockable structure 35 is made by means of a longitudinally extending connecting link 37 and the connection of the rockable structure 35 and the implement 15 is made by means of lift rods 37a having pressure spring means 38 thereon. The connection of the lift rods 37a with the side frames is made to lugs 39 thereon.

The fluid cylinder device 34 is supported at its forward end on a fore and aft movable supporting link 40 pivoted to the tractor as indicated at 41 and at its rearward end is anchored to the rear axle structure as indicated at 42. Within the longitudinally extending body portion 11 of the tractor is provided a fluid pressure source from which fluid is moved to the fluid cylinder device 34 by means of a hose coupling 44. The lifting arrangement, however, is not the feature of the invention. The invention lies in the arrangement of hitching straps for connecting the forward ends of the side frame elements with the longitudinally extending body portion of the tractor.

Any changes in the detail construction shall be within the spirit and scope of the present invention as defined by the appended claims.

What is claimed is:

1. In combination, an implement-supporting frame, an implement adapted to be connected to the implement-supporting frame, means for hitching the implement to the implement-supporting frame for vertical movement with respect thereto, said hitching means including a pair of hitch straps and a common hitch pin for securing the hitch straps to the implement-supporting frame for free fore and aft pivotal adjustment thereon, and fastening stud bolts provided on the tractor in longitudinally spaced relationship with respect to each other, said straps having open ended slots in their lower edges adapted to fit over the respective stud bolts, whereby the final arrangement of the straps with the stud bolts may be automatically made by movement of the tractor to cause the seating of the last-connected strap.

2. In combination, a tractor, an implement adapted to be connected to the tractor, means for hitching the implement to the tractor including a pair of hitch straps pivoted for fore and aft movement with respect to each other and carried on the implement, laterally projected fastening elements provided on the tractor in longitudinally spaced relationship with respect to each other, said hitch straps adapted to be respectively secured to the tractor by the fastening elements, at least one of said straps having an open ended slot in its edge, whereby the same may be automatically registered with its fastening element by movement of the tractor after the one strap has been rested on the fastening element and the other strap has been swung into and secured in its final position.

3. In combination, a tractor having a longitudinally extending body portion, an implement having longitudinally extending side frame members, pairs of hitch straps respectively connected with each of said side frame members for connecting the same to the respective sides of the longitudinally extending body portion of the tractor, the said straps of each pair being pivotable with respect to each other and with respect to their side frame, one of the straps of the pair adapted to be swung immediately for its connection with the side of the longitudinally extending body portion, said other of the straps of the pair having an open ended slot in its lower edge, a fastening bolt projecting from the side of the body portion on which the said latter strap may be temporarily rested, whereby upon movement of the tractor the edge of the latter strap will move along the fastening bolt until its registry is automatically found in the slot of the strap.

JOHN R. ORELIND.